United States Patent
Fujishiro

(10) Patent No.: US 12,408,230 B2
(45) Date of Patent: *Sep. 2, 2025

(54) COMMUNICATION CONTROL METHOD AND USER EQUIPMENT FOR TRANSITIONING BETWEEN RRC MODES

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,402

(22) Filed: Jul. 12, 2024

(65) Prior Publication Data
US 2024/0365426 A1    Oct. 31, 2024

Related U.S. Application Data

(63) Continuation of application No. 17/456,620, filed on Nov. 26, 2021, now Pat. No. 12,063,705, which is a continuation of application No. PCT/JP2020/020017, filed on May 20, 2020.

(30) Foreign Application Priority Data

May 28, 2019   (JP) ................. 2019-099350

(51) Int. Cl.
H04W 76/27    (2018.01)
H04W 76/30    (2018.01)

(52) U.S. Cl.
CPC ........... *H04W 76/27* (2018.02); *H04W 76/30* (2018.02)

(58) Field of Classification Search
None
See application file for complete search history.

(56) References Cited

U.S. PATENT DOCUMENTS

| 12,063,705 B2 * | 8/2024 | Fujishiro .............. H04W 76/30 |
| 2018/0049121 A1 | 2/2018 | Yamada et al. |
| 2018/0176834 A1 | 6/2018 | Wei et al. |
| 2019/0166553 A1 | 5/2019 | Ryoo et al. |

(Continued)

FOREIGN PATENT DOCUMENTS

WO    2016/152804 A1    9/2016

OTHER PUBLICATIONS

Kyocera; "Network-Controlled Conditional RRC Release"; 3GPP TSG-RAN WG2 #106; R2-1906655; May 13-17, 2019; pp. 1-3; Reno, USA.

(Continued)

*Primary Examiner* — Diane L Lo
(74) *Attorney, Agent, or Firm* — Studebaker Brackett PLLC

(57) ABSTRACT

A communication control method comprises transmitting, by a user equipment to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmitting, by the user equipment to the network node, second information indicating that the user equipment prefers to revert the first information to leave the RRC connected mode.

5 Claims, 11 Drawing Sheets

(56) References Cited

U.S. PATENT DOCUMENTS

2019/0306739 A1 10/2019 Kim et al.
2021/0195405 A1 6/2021 Gurumoorthy et al.

OTHER PUBLICATIONS

Intel Corporation; "Efficient RRC State Transitions"; 3GPP TSG RAN WG2 Meeting #105; R2-1900722; Feb. 25-Mar. 1, 2019; pp. 1-3; Athens, Greece.
Ericsson; "Efficient Transition to Idle and Inactive Mode"; 3GPP TSG-RAN2 Meeting #106; R2-1906604; May 13-17, 2019; pp. 1-6; Reno, USA.

* cited by examiner

COMMUNICATION CONTROL METHOD AND USER EQUIPMENT FOR TRANSITIONING BETWEEN RRC MODES

RELATED APPLICATIONS

The present application is a Continuation of U.S. patent application Ser. No. 17/456,620, filed on Nov. 26, 2021, which is a Continuation based on PCT Application No. PCT/JP2020/020017, filed on May 20, 2020, which claims the benefit of Japanese Patent Application No. 2019-099350 filed on May 28, 2019. The content of which is incorporated by reference herein in their entirety.

TECHNICAL FIELD

The present disclosure relates to a communication control method and a user equipment in mobile communication systems.

BACKGROUND ART

The 3rd Generation Partnership Project (3GPP), a standardization project for mobile communication systems, has defined, as modes of Radio Resource Control (RRC) for a user equipment, an RRC connected mode, an RRC inactive mode, and an RRC idle mode.

The RRC connected mode and the RRC inactive mode are modes in which an RRC connection for a user equipment is established. The RRC inactive mode is a mode in which an established RRC connection is suspended. The RRC idle mode is a mode in which an RRC connection for the user equipment is not established.

The user equipment in the RRC idle mode or the RRC inactive mode needs to monitor a downlink control channel only in a periodic paging occasion, and thus, power consumption of the user equipment is small. On the other hand, the user equipment in the RRC connected mode needs to frequently monitor at least the downlink control channel in order to perform data communication, and the power consumption of the user equipment is large.

Thus, there is a demand to realize a technique in which a user equipment can appropriately transition from an RRC connected mode to an RRC idle mode or an RRC inactive mode in order to reduce the power consumption of the user equipment.

SUMMARY

A communication control method according to an embodiment comprises transmitting, by a user equipment to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmitting, by the user equipment to the network node, second information indicating that the user equipment prefers to revert the first information to leave the RRC connected mode.

A user equipment according to an embodiment comprises a controller configured to transmit, to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmit, to the network node, second information indicating that the user equipment prefers to revert the first information to leave the RRC connected mode.

A chipset according to an embodiment for a user equipment is configured to execute processing of transmitting, to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmitting, to the network node, second information indicating that the user equipment prefers to revert the first information to leave the RRC connected mode.

A non-transitory computer-readable medium according to an embodiment comprises, stored thereupon, computer program instructions for execution by a user equipment. The program instructions are configured to cause the user equipment to execute processing of transmitting, to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmitting, to the network node, second information indicating that the user equipment prefers to revert the first information to leave the RRC connected mode.

A system according to an embodiment comprises a user equipment configured to transmit, to a network node, first information indicating that the user equipment prefers one of a RRC idle mode and a RRC inactive mode when data to be transmitted to the network node is not to occur in near future; and in response to changing a preferred RRC mode from a RRC mode indicated by the first information to a RRC connected mode, transmit, to the network node, second information indicating that the user equipment prefers to revert the first information to leave the RRC connected mode.

DESCRIPTION OF EMBODIMENTS

A mobile communication system according to an embodiment will be described with reference to the drawings. In the description of the drawings, the same or similar parts are designated with the same or similar reference signs.

Mobile Communication System

First, a configuration of a mobile communication system according to an embodiment will be described. Although the mobile communication system according to the embodiment is a 5G system of 3GPP, LTE may be at least partially applied to the mobile communication system.

Figure 1:
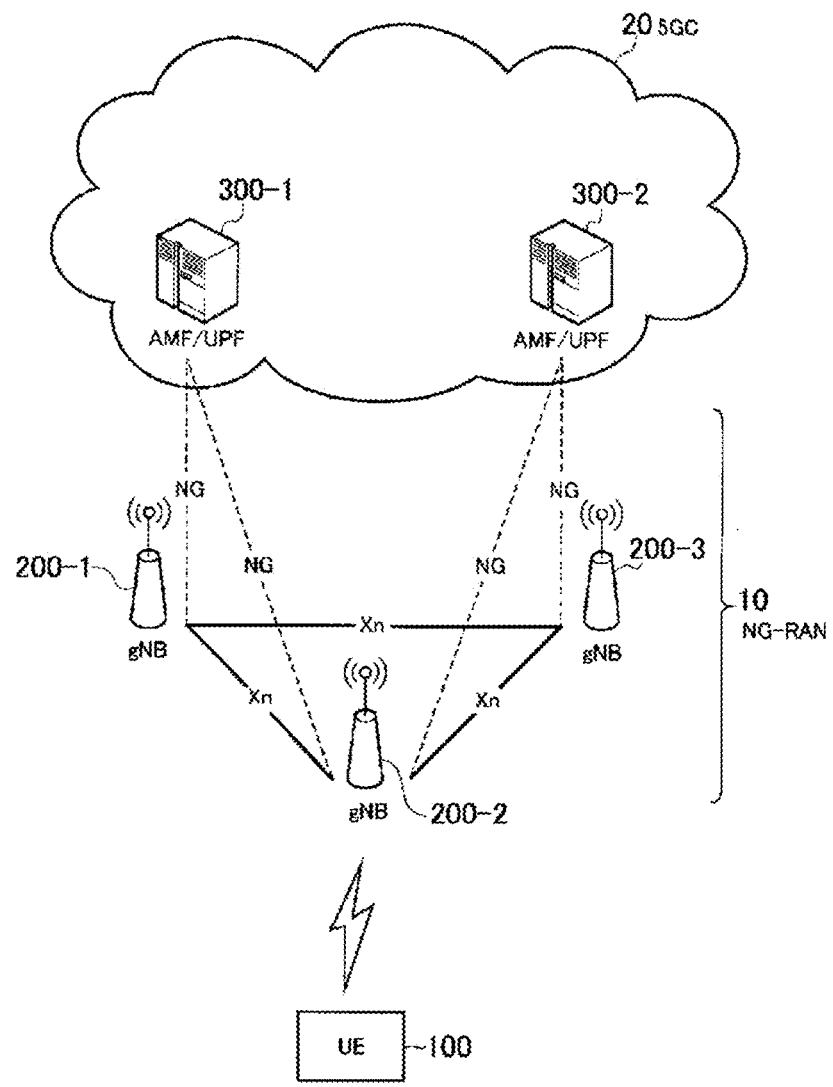
FIG. 1 is a diagram illustrating a configuration of a mobile communication system according to an embodiment.

FIG. 1 is a diagram illustrating a configuration of the mobile communication system according to the embodiment.

As illustrated in FIG. 1, the mobile communication system includes a User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base station interface. The gNB 200 manages one or more cells. The gNB 200 performs radio communication with the UE 100 that has established a connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

Note that the gNB may be connected to an Evolved Packet Core (EPC) which is an LTE core network, or an LTE base station may be connected to a 5GC. Moreover, the LTE base station may be connected to the gNB via the inter-base station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
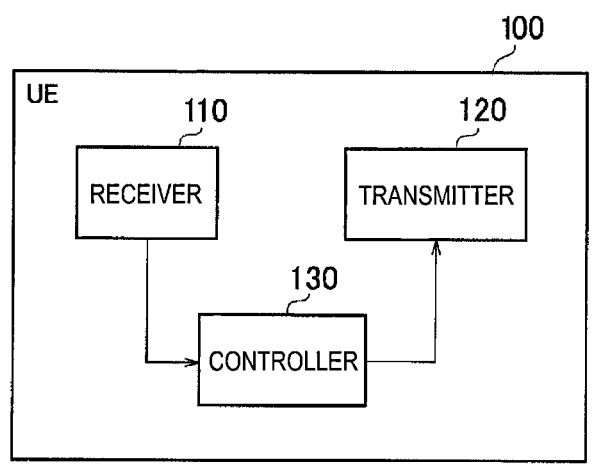
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) output by the controller 130 into a radio signal and transmits the signal from the antenna.

The controller 130 performs various type of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of process.

Figure 3:
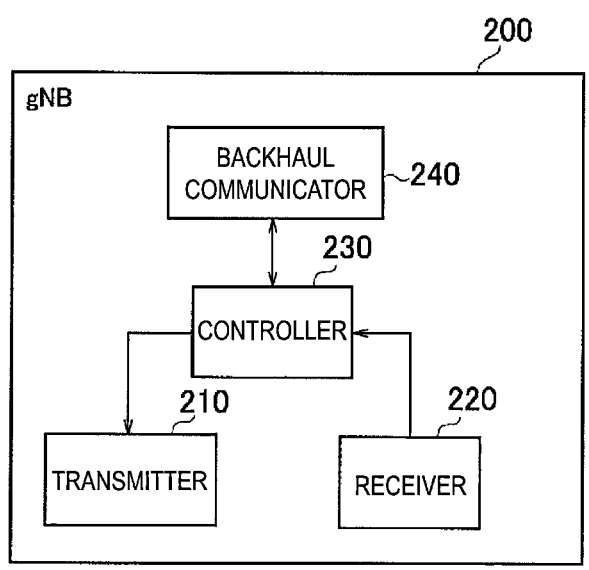
FIG. 3 is a diagram illustrating a configuration of a base station according to the embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of process.

The backhaul communicator 240 is connected to a neighboring base station via the inter-base station interface. The backhaul communicator 240 is connected to the AMF/UPF 300 via the base station to core network interface. Note that the gNB may include a Central Unit (CU) and a Distributed Unit (DU) (i.e., may be functionally divided), and both units may be connected to each other via an F1 interface.

Figure 4:
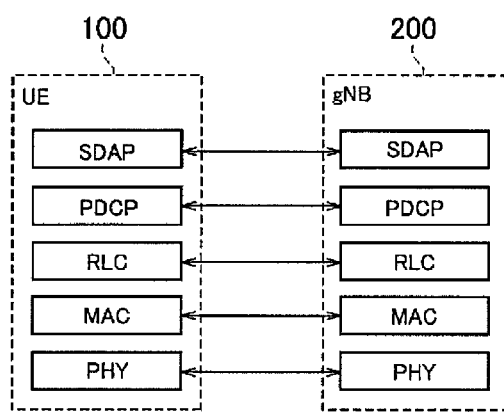
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by hybrid ARQ (HARQ), a random access procedure, and the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit by which the core network performs QoS control and a radio bearer that is a unit by which an Access Stratum (AS) performs QoS control. Note that in a case where a RAN is connected to the EPC, SDAP is not necessary.

Figure 5:
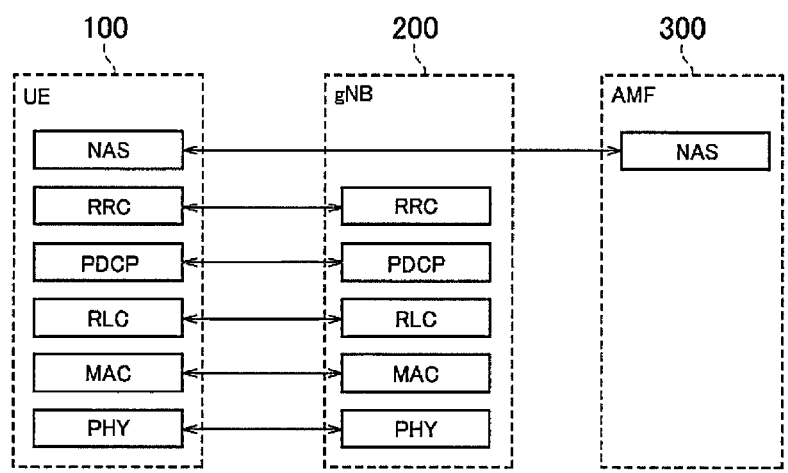
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is a connection (RRC connection) between the RRC of the UE 100 and the RRC of the gNB 200, the UE 100 is in an RRC connected mode. In a case where there is no connection (RRC connection) between the RRC of the UE 100 and the RRC of the gNB 200, the UE 100 is in an RRC idle mode. In a case where the RRC connection is suspended, the UE 100 is in an RRC inactive mode.

The NAS layer located higher than the RRC layer performs session management, mobility management, and the like. NAS signaling is transmitted between the NAS layer of the UE 100 and the NAS layer of the AMF 300.

Note that the UE 100 includes an application layer or the like other than the radio interface protocol.

Transition from RRC Connected Mode to Another Mode

Next, a transition from the RRC connected mode to another mode will be described.

The RRC connected mode and the RRC inactive mode are modes in which an RRC connection for the UE 100 is established. However, the RRC inactive mode is a mode in which an established RRC connection is suspended. Specifically, in the RRC inactive mode, context information for the UE 100 is retained in the gNB 200 and the UE 100, and thus, the UE 100 can smoothly transition to the RRC connected mode by using the retained context information. The RRC idle mode is a mode in which an RRC connection for the UE 100 is not established.

The UE 100 in the RRC idle mode or the RRC inactive mode needs to monitor a downlink control channel only in a periodic paging occasion, and thus, power consumption of the UE 100 is small. On the other hand, the UE 100 in the RRC connected mode needs to frequently monitor at least the downlink control channel in order to perform data communication, and the power consumption of the UE 100 is large. Regarding the uplink as well, the UE 100 in the RRC connected mode needs to periodically perform transmission of an uplink control channel (PUCCH), that is, Channel State Information (CSI) feedback, and the power consumption of the UE 100 is large.

Figure 6:
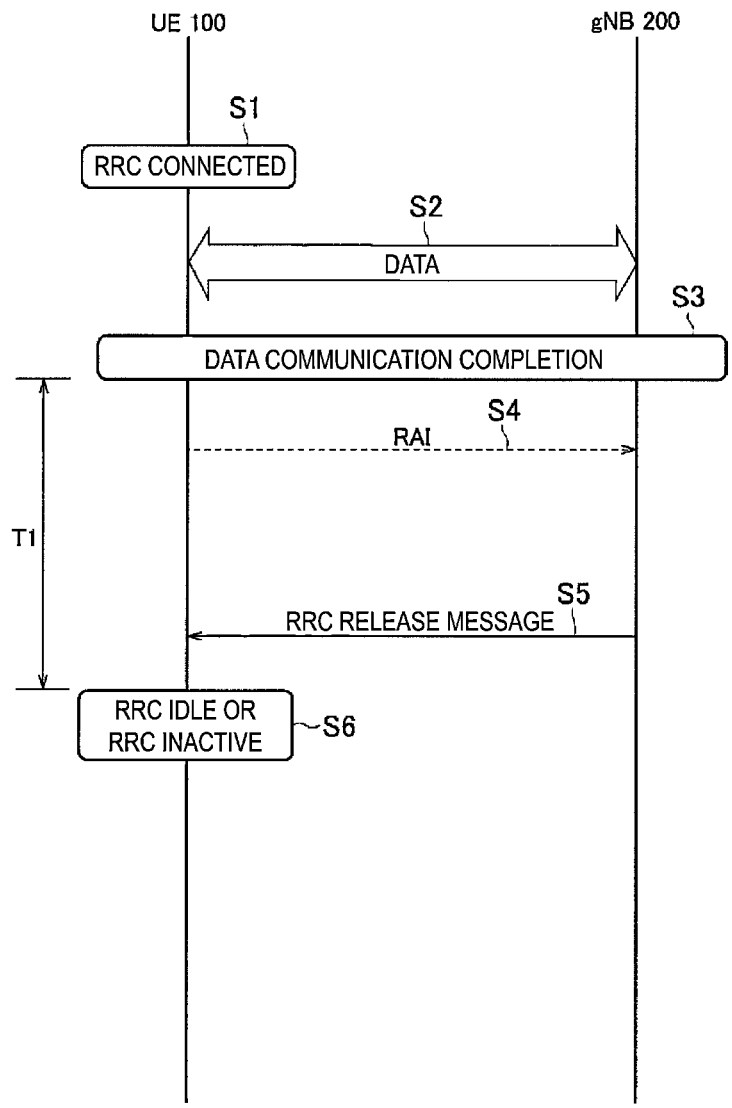
FIG. 6 is a diagram illustrating basic operations related to a transition from an RRC connected mode to another mode.

FIG. 6 is a diagram illustrating basic operations related to the transition from the RRC connected mode to another mode.

As illustrated in FIG. 6, in step S1, the UE 100 is in the RRC connected mode in a cell of the gNB 200. The UE 100 in the RRC connected mode performs data communication with the gNB 200.

In step S2, the UE 100 transmits uplink data to the gNB 200 via a Physical Uplink Shared Channel (PUSCH), and receives downlink data from the gNB 200 via a Physical Downlink Shared Channel (PDSCH).

In step S3, the UE 100 and the gNB 200 complete the data communication. Completion of the data communication refers to uplink data transmission completion when only uplink data transmission is performed, refers to downlink data transmission completion when only downlink data transmission is performed, and refers to uplink and downlink data transmission completion when uplink and downlink data transmission is performed.

In step S4, the UE 100 may transmit, to the gNB 200, a Release Assistance Indicator (RAI) which is an indicator indicating that data to be transmitted to the gNB 200 will not occur in the near future. The RAI may be a buffer status report indicating that a buffer size value is zero. The RAI may be enabled only when RAI activation is configured from the gNB 200. However, step S4 is not necessarily required and step S5 may be performed without step S4.

In step S5, the gNB 200 transmits, to the UE 100, an RRC release message which is a type of dedicated RRC message that is transmitted by UE-specific unicast transmission, in response to completion of data communication. In a case where the gNB 200 determines to make the UE 100 transition to the RRC inactive mode, the gNB 200 includes configuration information for the RRC inactive mode (SuspendConfig) in the RRC release message. SuspendConfig includes ran-PagingCycle which is a discontinuous reception (DRX) cycle for the RRC inactive mode, and fullI-RNTI or shortI-RNTI which is an identifier assigned to the UE 100 for the RRC inactive mode. On the other hand, in a case where the gNB 200 determines to make the UE 100 transition to the RRC idle mode, the gNB 200 does not include SuspendConfig in the RRC release message.

In step S6, the UE 100 transitions to the RRC idle mode or the RRC inactive mode, based on the RRC release messages received from the gNB 200. Specifically, the UE 100 transitions to the RRC inactive mode in a case where the RRC release message includes SuspendConfig, or the RRC idle mode in a case where the RRC release message does not include SuspendConfig.

Here, the UE 100 (RRC layer) transitions to the RRC idle mode or the RRC inactive mode at a timing that is the earlier one of a timing at which 60 ms elapses from receiving the RRC message and a timing at which a lower layer (layer 2) sends an acknowledgment in response to the RRC message.

In the basic operations illustrated in FIG. 6, the UE 100 needs to maintain the RRC connected mode despite the data communication completion, for a period T1 from completing the data communication in step S3 to transitioning to the RRC idle mode or the RRC inactive mode in step S6. The power of the UE 100 consumed during the period T1 is wasteful power that does not contribute to transmission and reception of data, and thus it is considered that there is room for reduction of the power consumption of UE 100 by reducing the period T1.

It can be also thought that in a case where, after a long time elapses from the completion of data communication (step S3), the next data communication is initiated, making the UE 100 transition to the RRC idle mode preferable; otherwise, making the UE 100 transition to the RRC inactive mode preferable. However, the gNB 200 may not have sufficient criteria to determine whether to make the UE 100 transition to the RRC idle mode or the RRC inactive mode.

First Embodiment

Figure 7:
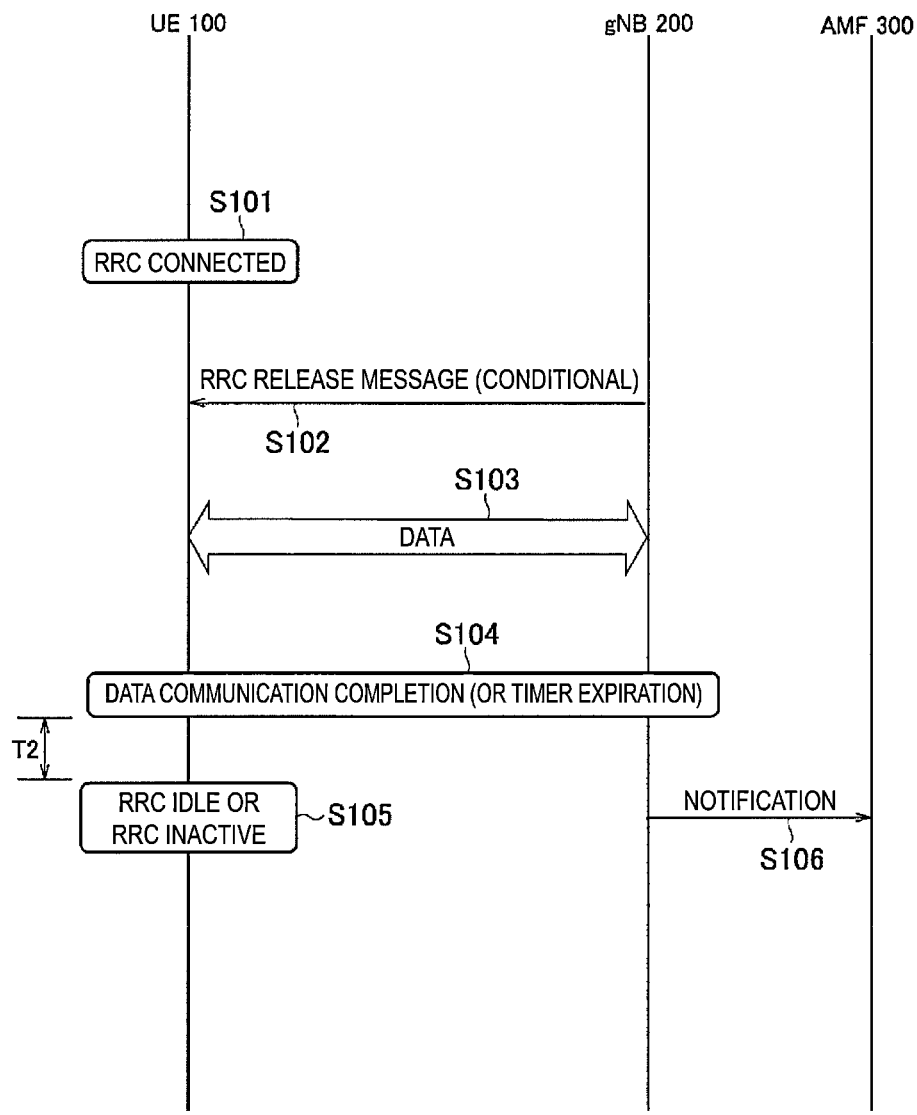
FIG. 7 is a diagram illustrating operations of the mobile communication system according to a first embodiment.

Next, a first embodiment will be described. FIG. 7 is a diagram illustrating operations of the mobile communication system according to the first embodiment.

As illustrated in FIG. 7, in step S101, the UE 100 is in the RRC connected mode in a cell of the gNB 200. The UE 100 in the RRC connected mode performs data communication with the gNB 200.

In step S102, the gNB 200 transmits, to the UE 100, an RRC release message with a condition for releasing or suspending the RRC connection of the UE 100 (hereinafter referred to as a "predetermined condition"). Such a conditional RRC release message may be an RRC release message including condition information specifying the predetermined condition. The conditional RRC release message can be a new RRC release message having a different format from the general RRC release message.

The UE 100 immediately transitions to the RRC idle mode or the RRC inactive mode when the UE 100 receives a general RRC release message. On the other hand, when the UE 100 receives the conditional RRC release message, the UE 100 leaves the transition to the RRC idle mode or RRC inactive mode pending, and maintains the RRC connected mode until the predetermined condition is met.

The predetermined condition may be configured for the UE 100 as configuration information (information element) in the RRC release message, or a predetermined condition defined by communication standards may be configured for the UE 100 in advance at the time of shipping the UE 100. Details of the predetermined condition are described in step S104.

In a case where the gNB 200 determines to make the UE 100 transition to the RRC inactive mode, the gNB 200 includes configuration information for the RRC inactive mode (SuspendConfig) in the RRC release message. On the other hand, in a case where the gNB 200 determines to make the UE 100 transition to the RRC idle mode, the gNB 200 does not include SuspendConfig in the RRC release message.

The UE 100 continuously checks whether the predetermined condition is met in response to reception of a conditional RRC release message from the gNB 200.

In step S103, the UE 100, after receiving the conditional RRC release message, performs data communication with the gNB 200 until the predetermined condition is met. For example, the UE 100 transmits uplink data to the gNB 200 via the PUSCH, or receives downlink data from the gNB 200 via the PDSCH.

In step S104, the UE 100 determines that the predetermined condition has been met. The predetermined condition is any one of conditions 1 to 3 below, or a combination of two or more of the conditions. In a case where the gNB 200 configures a predetermined condition for the UE 100, the gNB 200 may include one or more identifiers of the conditions 1 to 3 in the conditional RRC release message.

(1) Condition 1: The UE 100 completes the uplink data transmission to the gNB 200 (i.e., the last uplink data transmission ends).

For example, in a situation in which the gNB 200 has completed transmission of downlink data to the UE 100 and receives uplink data from the UE 100, the gNB 200 transmits an RRC release message specifying the condition 1 to the UE 100. In this case, the UE 100 is to autonomously transition to the RRC idle mode or the RRC inactive mode upon completion of the uplink transmission.

The completion of the uplink data transmission in the condition 1 may be a condition 1A that the UE 100 transmits, to the gNB 200, information indicating completion of the data transmission. For example, the UE 100 transmits the RAI described above to the gNB 200 as a complete notification (end marker) of the uplink data transmission, and autonomously transitions to the RRC idle mode or the RRC inactive mode at the time point of the end marker transmission.

The completion of the uplink data transmission in the condition 1 may be a condition 1B that the data transmission is completed for an amount of data or a transmission time that is notified in advance between the UE 100 and the gNB 200 before the completion of the data transmission. For example, prior to step S104, the UE 100 notifies the gNB 200 in advance of the amount of uplink data to be transmitted to the gNB 200 or the time to be taken to complete the uplink data transmission to the gNB 200. Such notifications may be made by way of the RAI. Then, the UE 100 autonomously transitions to the RRC idle mode or the RRC inactive mode when completing the data transmission of the amount of data notified in advance to the gNB 200 or the data transmission of the time notified in advance to the gNB 200.

The completion of the uplink data transmission in the condition 1 may be a condition 1C that, after the UE 100 has performed the last uplink data transmission, an acknowledgment (HARQ ACK or ARQ ACK) in response to this uplink data is received from the gNB 200. When receiving the acknowledgment corresponding to the last uplink data transmission from the gNB 200, the UE 100 autonomously transitions to the RRC idle mode or the RRC inactive mode. Note that, at the time of the last uplink data transmission, the UE 100 may transmit the end marker to the gNB 200 in order to indicate to the gNB 200 that it is the last uplink data transmission. For example, the UE 100 may transmit the MAC CE corresponding to the end marker to the gNB 200 with the same MAC PDU as the last uplink data.

The completion of the uplink data transmission under the condition 1 may be a combination of two or more of the conditions 1A to 1C.

(2) Condition 2: The UE 100 completes the downlink data reception from the gNB 200 (i.e., the last downlink data reception ends).

For example, in a situation in which the gNB 200 has completed reception of uplink data from the UE 100 and transmits downlink data to the UE 100, the gNB 200 transmits an RRC release message specifying the condition 2 to the UE 100. In this case, the UE 100 is to autonomously transition to the RRC idle mode or the RRC inactive mode upon completing the downlink data reception.

The completion of the downlink data reception in the condition 2 may be a condition 2A that the UE 100 receives information from the gNB 200 indicating the completion of the data transmission. For example, the gNB 200 transmits a complete notification (end marker) of the last downlink data transmission to the UE 100, and the UE 100 autonomously transitions to the RRC idle mode or the RRC inactive mode at the time point of the end marker reception. Note that, at the time of the last downlink data transmission, the gNB 200 may transmit the end marker to the UE 100 in order to indicate to the UE 100 that it is the last downlink data transmission. For example, the gNB 200 may transmit the MAC CE corresponding to the end marker to the UE 100 with the same MAC PDU as the last downlink data.

The completion of the downlink data reception in the condition 2 may be a condition 2B that the data reception is completed for an amount of data or a reception time that is notified in advance to the UE 100 by the gNB 200 before the completion of the downlink data reception. For example, prior to step S104, the gNB 200 notifies the UE 100 in advance of the amount of downlink data to be transmitted to the UE 100 or the time to be taken to complete the downlink data transmission to the UE 100. Then, the UE 100 autonomously transitions to the RRC idle mode or the RRC inactive mode upon completion of reception of the amount of data notified in advance from the gNB 200 or the reception in the time notified in advance from the gNB 200.

The completion of the downlink data reception in the condition 2 may be a condition 2C that after the UE 100 has performed the last downlink data reception, the UE 100 has transmitted to the gNB 200, an acknowledgment (HARQ ACK or ARQ ACK) in response to this downlink data. When transmitting, to the gNB 200, the acknowledgment corresponding to the last downlink data transmission, the UE 100 autonomously transitions to the RRC idle mode or the RRC inactive mode.

The completion of the downlink data reception in the condition 2 may be a combination of two or more of the conditions 2A to 2C.

(3) Condition 3: The time specified by way of the RRC release message from the gNB 200 elapses.

For example, the gNB 200 includes a timer value that defines a time for which the UE 100 is made to maintain in RRC connected mode in a conditional RRC release message. The UE 100 starts the timer with the timer value being configured when receiving the RRC release message and autonomously transitions to the RRC idle mode or the RRC inactive mode when the timer expires.

In step S105, the UE 100 transitions to the RRC idle mode or the RRC inactive mode in response to the predetermined condition being met. The UE 100 transitions to the RRC inactive mode in a case where the RRC release message received in step S102 includes SuspendConfig, or the RRC idle mode in a case where the RRC release message does not include SuspendConfig.

On the other hand, in step S106, the gNB 200 determines that the predetermined condition is met and the UE 100 assumes that the UE 100 transitions to a mode selected by the gNB 200 of the RRC idle mode or the RRC inactive mode. Then, the gNB 200 notifies the core network (AMF 300) of the mode of the UE 100 after the transition and an identifier of the UE 100. The notification may be performed on the NG interface.

According to the first embodiment, a period T2 from completing the data communication in step S104 to transitioning to the RRC idle mode or the RRC inactive mode in step S105 can be shortened. Specifically, the period T2 illustrated in FIG. 7 is shorter than the period T1 illustrated in FIG. 6. Thus, the power consumption of the UE 100 can be reduced compared to the basic operations illustrated in FIG. 7.

Modification 1 of First Embodiment

The above embodiment describes an example in which the UE 100 transmits the RAI to the gNB 200 before the gNB 200 transmits the conditional RRC release message to the UE 100.

Figure 8:
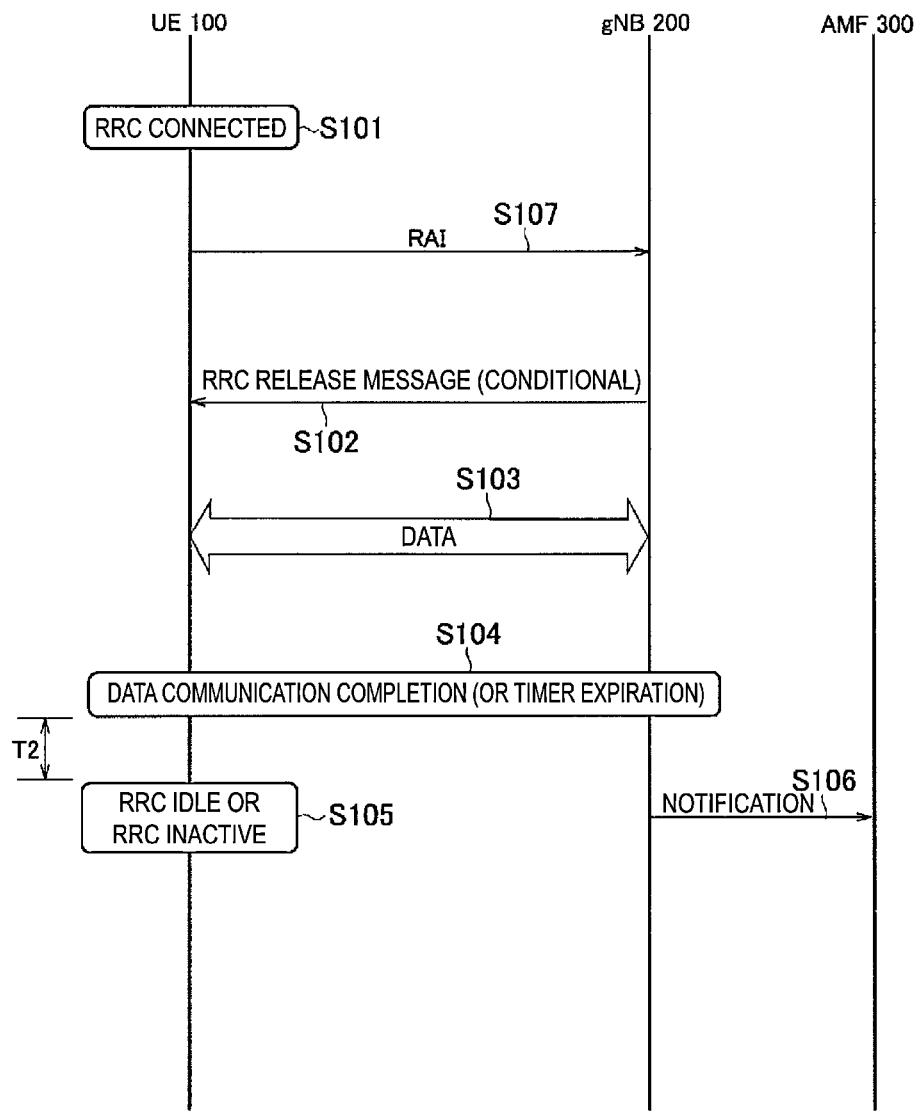
FIG. 8 is a diagram illustrating operations of the mobile communication system according to modification 1 of the first embodiment.

In the present modification, a specific example of such an RAI will be described. FIG. 8 is a diagram illustrating operations according to the present modification. As illustrated in FIG. 8, in step S107, the UE 100 transmits the RAI to the gNB 200 before the gNB 200 transmits the conditional RRC release message to the UE 100. The RAI may be a type of an RRC message. The UE 100 includes, in the RAI, at least one piece of information (information element) out of following "information 1" to "information 4".

Information 1: information indicating a mode desired by the UE 100 out of the RRC idle mode and the RRC inactive mode.

For example, the UE 100 predicts a length of a period in which uplink data transmitted to the gNB 200 and/or downlink data received from the gNB 200 is not generated. When the period is a certain period or less, the UE 100 selects the RRC inactive mode, and otherwise, the UE 100 selects the RRC idle mode, and the UE 100 includes the information indicating the selected mode in the RAI.

Information 2: Auxiliary information for the gNB 200 to determine a condition configuration value when the predetermined condition (trigger condition) as described above has been determined.

For example, when condition 3 described above, in other words, the condition that the time (timer value) specified by way of the conditional RRC release message from the gNB 200 has elapsed, is used as the trigger condition, the UE 100 includes the auxiliary information for the gNB 200 to determine the timer value in the RAI. The UE 100 may predict in how much more time the data communication ends, and include the predicted time in the RAI. The gNB 200 determines the timer value included in the conditional RRC release message, based on the time notified from the UE 100. In this manner, for example, the UE 100 can transition to the RRC idle mode or the RRC inactive mode without waiting for confirmation of the HARQ ACK or the RLC ACK, which has hitherto been necessary in RRC Release, and thus time from completion of data communication to transition to the RRC idle mode or the RRC inactive mode can be reduced.

Alternatively, when a condition that radio quality (RSRP, RSRQ) has fallen below a threshold is used as the trigger condition (hereinafter referred to as "condition 4"), the UE 100 includes the auxiliary information for the gNB 200 to determine the threshold in the RAI. For example, the UE 100 may identify the minimum radio quality necessary for satisfying required QoS according to a type of an application executed by the UE 100, and include a value of the identified radio quality in the RAI. The gNB 200 determines a radio quality threshold included in the conditional RRC release message, based on the value of the radio quality notified from the UE 100.

Alternatively, when a condition that the amount of data in a buffer of the UE 100 has fallen below a threshold is used as the trigger condition (hereinafter referred to as "condition 5"), the UE 100 includes the auxiliary information for the gNB 200 to determine the threshold in the RAI.

Information 3: Auxiliary information for the gNB 200 to determine which condition is configured by the gNB 200 in the conditional RRC release message.

The UE 100 includes the auxiliary information for the gNB 200 to determine any one of conditions 1 to 5 described above in the RAI. For example, the UE 100 includes a condition identifier indicating a condition desired by the UE 100, out of conditions 1 to 5, in the RAI. When the UE 100 executes such an application that the UE 100 performs communication only when the radio quality is satisfactory, the UE 100 may include a condition identifier indicating condition 4 as the desired condition in the RAI.

Information 4: Auxiliary information for the gNB 200 to determine which of the conditional RRC release message or a regular RRC release message is transmitted.

The UE 100 includes information indicating whether the UE 100 desires the gNB 200 to transmit the conditional RRC release message or desires the gNB 200 to transmit the regular RRC release message (specifically, an unconditional RRC release message) in the RAI.

Note that the RAI according to the present modification may implicitly indicate, for the gNB 200, whether or not the UE 100 supports reception of the conditional RRC release message. Specifically, only the UE 100 that supports reception of the conditional RRC release message can be configured to transmit the RAI according to the present modification to the gNB 200. Alternatively, the UE 100 may include, in the RAI, an indicator (flag) for explicitly indicating whether or not the UE 100 supports reception of the conditional RRC release message.

Modification 2 of First Embodiment

Figure 9:
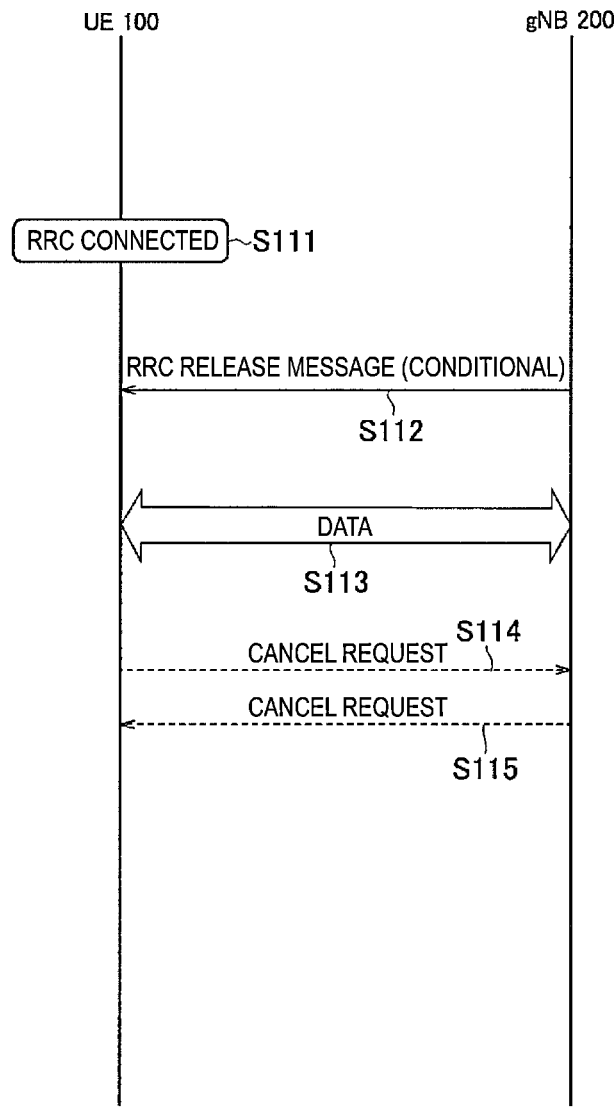
FIG. 9 is a diagram illustrating operations of the mobile communication system according to modification 2 of the first embodiment.

Next, a description will be given of differences between modification 2 of the first embodiment, and the first embodiment and modification 1 thereof described above. FIG. 9 is a diagram illustrating operations of the mobile communication system according to modification 2 of the first embodiment.

As illustrated in FIG. 9, steps S111 to S113 are the same as the first embodiment described above.

In the present modification, after receiving a conditional RRC release message from the gNB 200, the UE 100 transmits, to the gNB 200, a cancel request to cancel the releasing or suspending of the RRC connection (step S114), or receives a cancel request from the gNB 200 (step S115). A response to the cancel request may be further transmitted and received. Such signaling may be made by way of an RRC message or a MAC Control Element (CE). The cancel request may include an information element indicating a reason for cancellation.

Thus, even after the conditional RRC release message has been received, the RRC connected mode can be continued to be maintained, such as in a case where data is unexpectedly generated.

Here, a specific example of such cancellation will be described.

Firstly, one example of a case in which the UE 100 initiates the cancellation is a case in which the UE 100 anticipates generation of new uplink data. In this case, the UE 100 transmits a cancel request to the gNB 200 (step S114). The cancel request may be an RAI cancel request that requests cancellation of the RAI. When the gNB 200 receives the cancel request from the UE 100, the gNB 200 determines whether or not to cancel RRC connection release or suspension by the conditional RRC release message. Then, when the gNB 200 determines to cancel the RRC connection release or suspension, the gNB 200 may transmit a conditional RRC Release cancel command for indicating the cancellation to the UE 100.

Secondly, one example of case in which the gNB 200 initiates the cancellation is a case in which the gNB 200 anticipates generation of new downlink data. For example, when the AMF 300 transmits notification about new downlink data to the gNB 200, the gNB 200 can anticipate generation of new downlink data. In this case, the gNB 200 transmits the above-described cancel request or conditional RRC Release cancel command to the UE 100.

The UE 100 that has received the conditional RRC Release cancel command discards a conditional RRC Release command. Specifically, the UE 100 discards condition information configured and stored with the conditional RRC release message. When the UE 100 has performed measurement for evaluating whether or not the condition has been met (for example, measurement of RSRP) and timer operation, the UE 100 stops the measurement and the timer operation. Then, the UE 100 maintains the RRC connected mode.

Alternatively, instead of discarding the conditional RRC Release command, the UE 100 may store condition information corresponding to the conditional RRC Release command, and suspend evaluation as to whether or not the condition has been met. Then, the UE 100 may restart application of the stored condition information when resumption of the conditional RRC Release command is indicated by the gNB 200.

Second Embodiment

Figure 10:
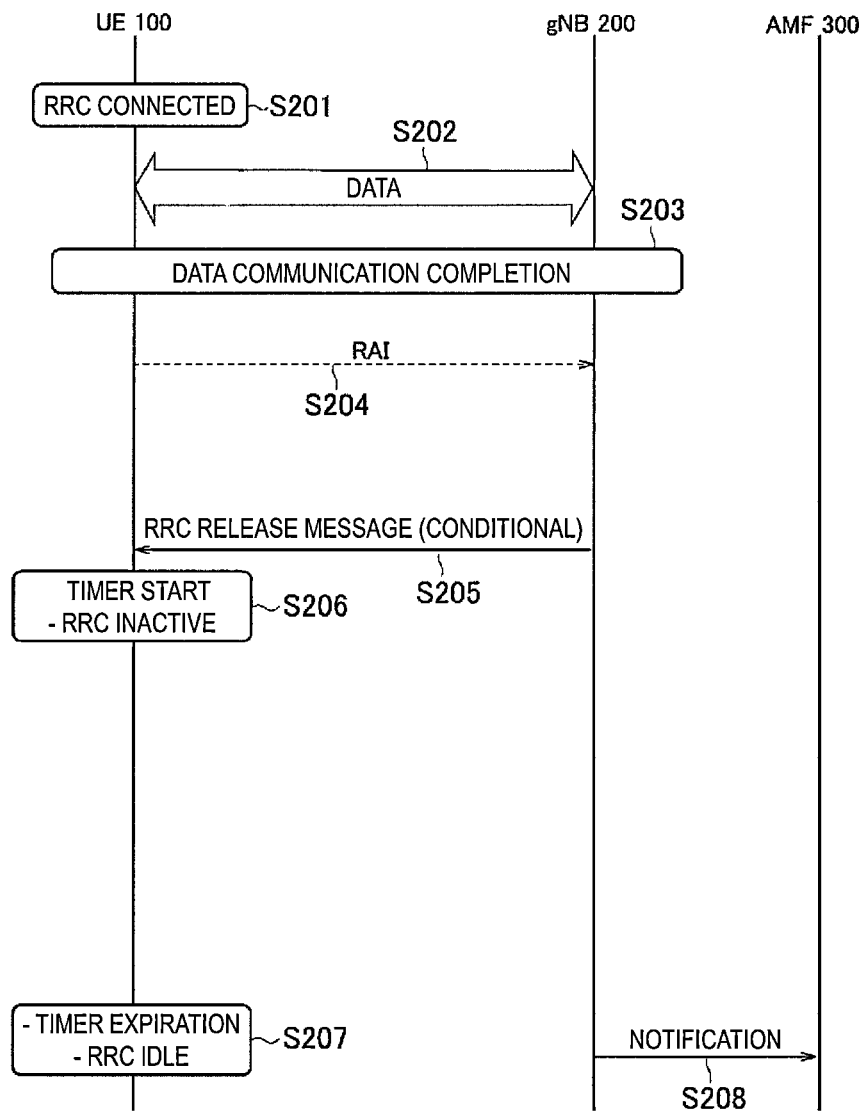
FIG. 10 is a diagram illustrating operations of the mobile communication system according to a second embodiment.

Next, a difference between a second embodiment and the first embodiment described above will be described. FIG. 10 is a diagram illustrating operations of the mobile communication system according to the second embodiment.

As illustrated in FIG. 10, in step S201, the UE 100 is in the RRC connected mode in a cell of the gNB 200. The UE 100 in the RRC connected mode performs data communication with the gNB 200.

In step S202, the UE 100 transmits uplink data to the gNB 200 via the PUSCH, or receives downlink data from the gNB 200 via the PDSCH.

In step S203, the UE 100 and the gNB 200 complete the data communication. Completion of the data communication refers to uplink data transmission completion when only uplink data transmission is performed, refers to downlink data transmission completion when only downlink data transmission is performed, and refers to uplink and downlink data transmission completion when uplink and downlink data transmission is performed.

In step S204, the UE 100 may transmit, to the gNB 200, a RAI which is an indicator indicating that data to be transmitted to the gNB 200 will not occur in the near future. The RAI may be a buffer status report indicating that a buffer size value is zero. The RAI may be enabled only when RAI activation is configured from the gNB 200. However, step S4 is not necessarily required and step S205 may be performed without step S204.

In step S205, the gNB 200 transmits, to the UE 100, an RRC release message with a condition (predetermined condition) for releasing the RRC connection of the UE 100. The RRC release message according to the second embodiment is an RRC release message which makes the UE 100 transition to the RRC inactive mode, and which is associated with the predetermined condition that makes the UE 100 transition to the RRC idle mode.

In the second embodiment, the predetermined condition is a condition that a predetermined time elapses from the reception of the RRC release message or the transition to the RRC inactive mode. The predetermined condition according to the second embodiment may be a condition that a trigger for transitioning to the RRC connected mode does not occur within the predetermined time after the UE 100 transitions to the RRC inactive mode.

Such a conditional RRC release message may be an RRC release message including condition information specifying the predetermined condition. The conditional RRC release message can be a new RRC release message having a different format from the general RRC release message.

In the second embodiment, the conditional RRC release message may include the SuspendConfig described above. The conditional RRC release message may also include at least one parameter to adopt after transitioning to the RRC idle mode.

In step S206, the UE 100 transitions to the RRC inactive mode in response to receiving the conditional RRC release message from the gNB 200. The UE 100 starts a timer corresponding to the predetermined time when receiving the conditional RRC release message or transitioning to the RRC inactive mode.

The predetermined time (timer value) may be configured for the UE 100 as the configuration information (information element) in the conditional RRC release message, may be configured for the UE 100 as the configuration information (information element) in a system information block (SIB) broadcast by the gNB 200, or a timer value defined by communication standards may be configured for the UE 100 in advance at the time of shipping the UE 100.

The UE 100 may stop the timer in a case where a trigger for transitioning to the RRC connected mode occurs while the timer is running. The trigger for transitioning to the RRC connected mode may be the reception by the UE 100 of a paging message from the gNB 200, or the occurrence, in the UE 100, of uplink data to be transmitted. Alternatively, the UE 100 may stop the timer when transitioning to the RRC connected mode after the trigger for transitioning to the RRC connected mode occurs while the timer is running.

The UE 100 may reset the timer value and restart the timer in a case of receiving an indication of timer restart from the gNB 200 while the timer is running. The indication may be included in a RAN paging message transmitted by the eNB 200 or may be included in the system information. Thus, the gNB 200 can control the time for which the UE 100 is maintained in the RRC inactive mode.

Here, the description proceeds under the assumption that the UE 100 has allowed the timer to expire without stopping the timer.

In step S207, the UE 100 autonomously transitions to the RRC idle mode from the RRC inactive mode in response to the timer expiring.

On the other hand, the gNB 200 also manages the timer in the same manner as the UE 100, and assumes that the UE 100 has transitioned to the RRC idle mode in response to the expiration of the timer. Then, in step S208, the gNB 200 notifies the core network (AMF 300) of the UE 100 having transitioned to the RRC idle mode and the identifier of the UE 100. The notification may be performed on the NG interface.

Note that, instead of the timer, the predetermined time may be represented by the number of paging reception occasions (number of times) during the RRC inactive mode. The paging reception occasions occur in a cycle corresponding to ran-PagingCycle in SuspendConfig. For example, the UE 100 may transition from the RRC inactive mode to the RRC idle mode in a case of receiving no paging message in a configured number of paging reception occasions.

According to the second embodiment, even in the case where the gNB 200 does not include sufficient data to determine whether to make the UE 100 transition to the RRC idle mode or the RRC inactive mode, the UE 100 autonomously transitions to the RRC idle mode from the RRC inactive mode, and can thereby use the RRC idle mode and the RRC inactive mode appropriately for different purposes.

Other Embodiments

Figure 11:
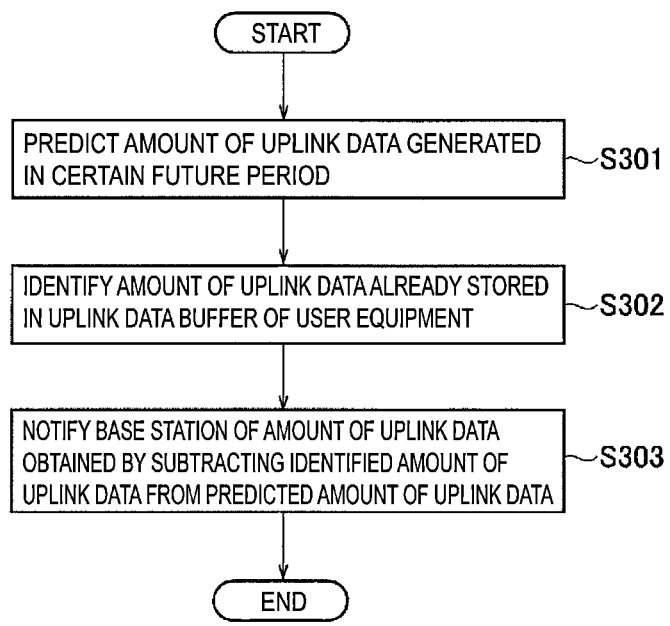
FIG. 11 is a diagram illustrating operations according to other embodiments.

FIG. 11 is a diagram illustrating operations according to other embodiments. The present communication control method is a method in view of carrier aggregation, in which a primary cell and one or more secondary cells are used simultaneously.

As illustrated in FIG. 11, in step S301, the UE 100 predicts the amount of uplink data generated in a certain future period. For example, the UE 100 predicts the amount of uplink data generated in a certain future period, based on information obtained in an upper layer with respect to a radio layer (a PHY layer, a MAC layer, an RLC layer, a PDCP layer, and an SDAP layer), for example, an application layer or the like. The UE 100 may perform prediction based on a type of an application, or may perform prediction based on the number of applications to be executed.

In step S302, the UE 100 identifies the amount of uplink data already stored in an uplink data buffer of the UE 100. For example, the UE 100 identifies the amount of uplink data stored in the uplink data buffer of all of or a part of the layers of the MAC layer, the RLC layer, and the PDCP layer. In other words, the UE 100 identifies the amount of uplink data (specifically, a buffer status report (BSR) report value) to be reported with a BSR transmitted from the UE 100 to the gNB 200 in the MAC layer. Note that step S302 may be performed before step S301.

In step S302, the UE 100 notifies the gNB 200 of the amount of uplink data, which is obtained by subtracting the amount of uplink data identified in step S302 from the amount of uplink data predicted in step S301. Step S3 may be performed at the time of message 3 (Msg3) transmission or message 5 (Msg5) transmission in the random access procedure, or at the time of subsequent message transmission.

The amount of uplink data notified to the gNB 200 in step S302 is used for control related to the secondary cell configured for the UE 100 by the gNB 200. For example, the control related to the secondary cell may include determination as to whether the secondary cell is configured for the UE 100 or the configuration is released, or may include determination as to whether the secondary cell already configured for the UE 100 is enabled (activated) or disabled (deactivated).

In this manner, instead of directly notifying a prediction value of the amount of uplink data generated in a certain future period to the gNB 200, the UE 100 notifies a result obtained by subtracting the BSR report value from the prediction value to the gNB 200. Here, the gNB 200 can identify the BSR report value, based on the BSR transmitted from the UE 100.

When the BSR report value is included in the prediction value of the amount of uplink data generated in a certain future period, the amount of uplink data corresponding to the BSR report value may be notified twice, which may cause the gNB 200 to estimate the amount of uplink data of the UE 100 to be larger than the actual amount, and thereby configure or enable the secondary cell more than necessary, thus increasing the power consumption of the UE 100. According to the method illustrated in FIG. 11, the overlapping part as described above can be eliminated, and thus by the gNB 200 more appropriately performing the control related to the secondary cell, the power consumption of the UE 100 can be reduced.

Note that the method illustrated in FIG. 11 may be applied after the UE 100 transmits the BSR to the gNB 200. Specifically, when the UE 100 does not transmit the BSR to the gNB 200, the prediction value of the amount of uplink data generated in a certain future period may be directly notified to the gNB 200.

The embodiments above are described mainly for a 5G system (NR), but the operations according to the embodiments may be applied to LTE.

In the embodiments described above, the UE 100 may be a UE for a machine type communication application or an IoT application.

Note that a program causing a computer to execute each of the processes performed by the UE 100 or the gNB 200 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the UE 100 or the gNB 200 may be integrated to configure at least a portion of the UE 100 or the gNB 200 as a semiconductor integrated circuit (chipset, SoC).

An embodiment has been described above in detail with reference to the drawings; however, specific configurations are not limited to those described above, and various design modifications can be made without departing from the gist of the present disclosure.

The invention claimed is:

1. A communication control method comprising:
transmitting, by a user equipment to a network node, first information indicating that the user equipment prefers one of a RRC idle mode and a RRC inactive mode when data to be transmitted to the network node is not to occur in near future; and
in response to changing a preferred RRC mode from a RRC mode indicated by the first information to a RRC connected mode, transmitting, by the user equipment to the network node, second information indicating that the user equipment prefers to revert the first information to leave the RRC connected mode.

2. A user equipment comprising:
a controller configured to:
transmit, to a network node, first information indicating that the user equipment prefers one of a RRC idle mode and a RRC inactive mode when data to be transmitted to the network node is not to occur in near future; and
in response to changing a preferred RRC mode from a RRC mode indicated by the first information to a RRC connected mode, transmit, to the network node, second information indicating that the user equipment prefers to revert the first information to leave the RRC connected mode.

3. A chipset for a user equipment, the chipset configured to execute processing of:
transmitting, to a network node, first information indicating that the user equipment prefers one of a RRC idle mode and a RRC inactive mode when data to be transmitted to the network node is not to occur in near future; and
in response to changing a preferred RRC mode from a RRC mode indicated by the first information to a RRC connected mode, transmitting, to the network node, second information indicating that the user equipment prefers to revert the first information to leave the RRC connected mode.

4. A non-transitory computer-readable medium comprising, stored thereupon, computer program instructions for execution by a user equipment, the program instructions being configured to cause the user equipment to execute processing of:
transmitting, to a network node, first information indicating that the user equipment prefers one of a RRC idle mode and a RRC inactive mode when data to be transmitted to the network node is not to occur in near future; and
in response to changing a preferred RRC mode from a RRC mode indicated by the first information to a RRC connected mode, transmitting, to the network node, second information indicating that the user equipment prefers to revert the first information to leave the RRC connected mode.

5. A system comprising:
a user equipment configured to:
transmit, to a network node, first information indicating that the user equipment prefers one of a RRC idle mode and a RRC inactive mode when data to be transmitted to the network node is not to occur in near future; and
in response to changing a preferred RRC mode from a RRC mode indicated by the first information to a RRC connected mode, transmit, to the network node, second information indicating that the user equipment prefers to revert the first information to leave the RRC connected mode.

* * * * *